United States Patent
Duplichan

(10) Patent No.: US 7,424,719 B2
(45) Date of Patent: Sep. 9, 2008

(54) APPLICATION WITH MULTIPLE EMBEDDED DRIVERS

(75) Inventor: Steven Scott Duplichan, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 10/909,872

(22) Filed: Aug. 2, 2004

(65) Prior Publication Data

US 2006/0026602 A1 Feb. 2, 2006

(51) Int. Cl.
*G06F 3/00* (2006.01)
*G06F 9/44* (2006.01)
*G06F 9/445* (2006.01)

(52) U.S. Cl. .................. 719/321; 717/168; 717/174

(58) Field of Classification Search .............. 713/1, 713/2; 717/168–178; 719/321–327
See application file for complete search history.

(56) References Cited

U.S. PATENT DOCUMENTS

| | | | |
|---|---|---|---|
| 5,794,245 A | 8/1998 | Chen | |
| 5,802,365 A | 9/1998 | Kathail et al. | |
| 6,182,275 B1 * | 1/2001 | Beelitz et al. | 717/175 |
| 6,353,928 B1 * | 3/2002 | Altberg et al. | 717/175 |
| 6,496,793 B1 | 12/2002 | Veditz et al. | |
| 6,567,860 B1 | 5/2003 | Maxwell et al. | |
| 6,735,756 B1 | 5/2004 | Linn et al. | |
| 7,058,563 B1 * | 6/2006 | Chrysanthakopoulos et al. | 703/24 |
| 7,178,142 B2 * | 2/2007 | Bennett et al. | 717/168 |

* cited by examiner

*Primary Examiner*—Meng-Ai An
*Assistant Examiner*—Charles E Anya

(57) ABSTRACT

Various systems, methods, and programs embodied in computer-readable mediums are provided for driver execution in association with an application. When an application is executed in a computer system, a processor compatibility of an operating system executed in the computer system is determined. In this respect, the operating system is compatible with one of a plurality of predefined types of processors. An association is drawn between the processor compatibility of the operating system and one of a plurality of drivers embedded in the application, where the one of the drivers is compatible with the operating system. The execution of the one of the drivers that is compatible with the operating system is implemented in the computer system.

16 Claims, 3 Drawing Sheets

APPLICATION WITH MULTIPLE EMBEDDED DRIVERS

BACKGROUND

In some situations, one may execute an application such as a system utility in a computer system that accesses various hardware in the computer system such as processor hardware or memory hardware to perform various functions such as memory analysis. Such applications typically require a driver to access the desired hardware.

Currently computer systems employ one of multiple different types of processors that may be, for example, 32 bit processors, 64 bit processors, or other processors. Operating systems are provided in various different versions, where each version is adapted for one of the processor types. The driver needed to access the hardware on a given computer system is selected so as to match the version of the operating system running on the computer system. It can be confusing and time consuming to track which driver needs to be executed on a given computer system to provide computer hardware access in conjunction with the execution of a given application such as a system utility.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
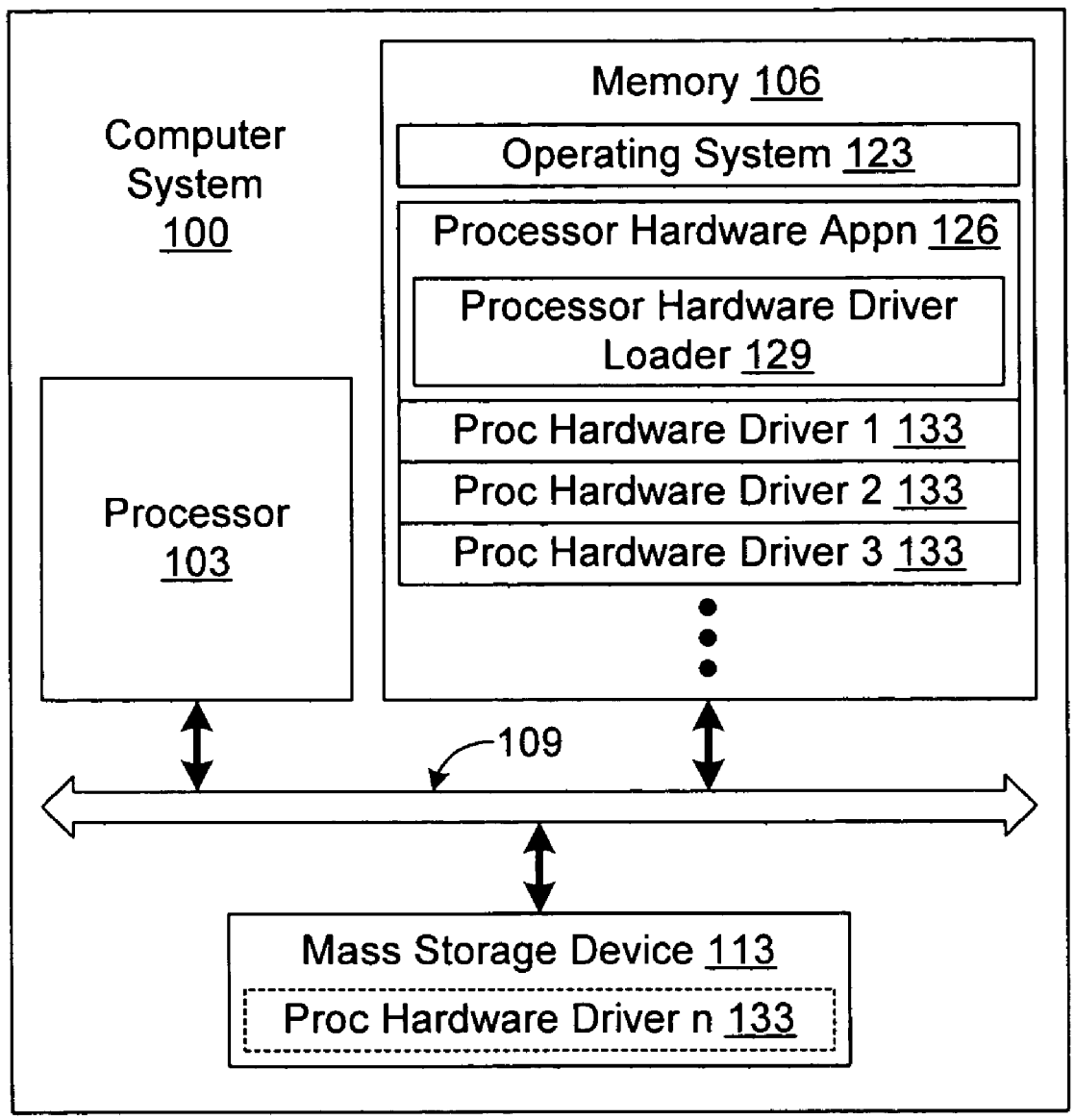
FIG. 1 is a drawing of a computer system that includes an application with multiple embedded drivers according to an embodiment of the present invention.

With reference to FIG. 1, shown is a block diagram of a computer system 100 according to an embodiment of the present invention. The computer system 100 includes a processor circuit having a processor 103 and a memory 106, both of which are coupled to a local interface 109. The local interface may be, for example, a data bus with an accompanying control bus as can be appreciated by those with ordinary skill in the art. In this respect, the computer system 100 may be, for example, a desktop, laptop, personal digital assistant, or other such device with like capability as can be appreciated. The computer system 100 includes a mass storage device 113. The mass storage device 113 is operatively coupled to the local interface 109 and is accessible by the processor 103. In this respect, the mass storage device 113 is operatively coupled to the processor circuit within the computer system 100 as can be appreciated.

The computer system 100 includes various components that are stored in the memory 106 and are executable by the processor 103. These components may be, for example, software components or firmware components as can be appreciated. These components include, for example, an operating system 123 and a processor hardware application 126. In addition, other components may be stored in the memory 106 and executable by the computer system 100 such as various applications as are typically found in computer systems. Such applications may comprise word processors, spreadsheets, and a myriad of other types of applications as can be appreciated by those with ordinary skill in the art. The operating system 123 may be, for example, a Windows™ operating system created by Microsoft Corporation of Redmond, Wash., or other operating system.

The processor hardware application 126 is executed in the computer system 100 to access various features of hardware components within the computer system 100 such as, for example, the circuitry of the processor 103 itself, memory components that make up a portion of the memory 106, or other components as can be appreciated. For example, the processor hardware application 126 may be a utility configured to access hardware such as to search system memory or to temporarily mount a file system, etc. The hardware components accessed may reside, for example, on a motherboard associated with the computer system 100 or on some other electrical circuit as can be appreciated. In order to access hardware within the computer system 100, an appropriate driver associated with such hardware is executed by the processor 103. Such a driver facilitates communication and access to the various components described above on the part of applications executed by the processor 103. Stated another way, once the appropriate driver is executed, the processor hardware application 126 may then access various aspects of the hardware within the computer system 100 through the driver. Alternatively, the processor hardware application 126 may be any application other than one that accesses processor hardware, and still needs a driver for other purposes as can be appreciated.

However, the design of the processor 103 may vary depending upon the manufacturer. For example, typical types of processors 103 may be, for example, the Intel Architecture, 32 bit (IA-32), or the Intel Architecture, 64 bit (IA-64), both manufactured by Intel Corporation of Santa Clara, Calif., or the AMD 64 bit processor (AMD64) manufactured by AMD of Sunnyvale, Calif.

The operating system 123 is written to be compatible with each design or type of processor 103. Consequently, the processor hardware driver that is executed to provide hardware access to the processor hardware application 126 needs to be compatible with both the operating system 123 and the type of processor 103.

To provide for the execution of a processor hardware driver 133 compatible with the respective operating system 123 and type of processor 103 to facilitate hardware access for the processor hardware application 126, the processor hardware application 126 includes a processor hardware driver loader 129. Also, embedded within the processor hardware application 126 are a number of processor hardware drivers 133. In this respect, each of the processor hardware drivers 133 is compatible with a corresponding one of a number of operating systems 123, where each of the operating systems is compatible with a corresponding one of the different types of processors 103.

Each of the processor hardware drivers 133 is embedded within the processor hardware application 126, for example, by appending the same to the end of the processor hardware application 126. However, there is no indication within the processor hardware application 126 that the processor hardware drivers 133 are included therein. In this respect, the processor hardware driver loader 129 is executed upon the execution of the processor hardware application 126 to cause a respective one of the processor hardware drivers 133 compatible with the operating system 123 and the corresponding processor 103 to be executed to facilitate access to the hardware of the computer system 100 as described above. Alternatively, one of the processor hardware driver 133 may comprises a driver that facilitates access of components or peripheral devices other than processor hardware, such drivers being, nonetheless compatible with a specific processor type, etc.

In addition, the computer system 100 may include one or more peripheral devices (not shown). In particular, such peripheral devices may include, for example, a keyboard, keypad, touch pad, touch screen, microphone, scanner, mouse, joystick, or one or more push buttons, etc. The peripheral devices may also include display devices, indicator lights, speakers, printers, etc. Specific display devices may be, for example, cathode ray tubes (CRTs), liquid crystal display screens, gas plasma-based flat panel displays, or other types of display devices, etc.

As described above, the components stored in the memory 106/mass storage device 113 are executable by the processor 103. In this respect, the term "executable" means a program file that is in a form that can ultimately be run by the processor 103. Examples of executable programs may be, for example, a compiled program that can be translated into machine code in a format that can be loaded into a random access portion of the memory 106 and run by the processor 103, or source code that may be expressed in proper format such as object code that is capable of being loaded into a of random access portion of the memory 106 and executed by the processor 103, etc. An executable program may be stored in any portion or component of the memory 106 or in the mass storage device 113 including, for example, random access memory, read-only memory, a hard drive, compact disk (CD), floppy disk, or other memory components as described herein.

The memory 106 is defined herein as volatile memory and data storage components. Volatile components are those that do not retain data upon a loss of power. Thus, the memory 106 may comprise, for example, random access memory (RAM). The RAM may comprise, for example, static random access memory (SRAM), dynamic random access memory (DRAM), or magnetic random access memory (MRAM) and other like memory devices.

The mass storage device 113 is defined herein as nonvolatile data storage components. Nonvolatile components are those that retain data upon a loss of power. Thus, the mass storage device 113 may comprise, for example, read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. The ROM may comprise, for example, a programmable read-only memory (PROM), an erasable programmable read-only memory (EPROM), an electrically erasable programmable read-only memory (EEPROM), or other like memory device.

In addition, the processor 103 may represent multiple processors and the memory 106 may represent multiple memories that operate in parallel. In such a case, the local interface 109 may be an appropriate network that facilitates communication between any two of the multiple processors, between any processor and any one of the memories, or between any two of the memories etc. The processor 106 may be of electrical, optical, or of some other construction as can be appreciated by those with ordinary skill in the art.

The operating system 123 is executed to control the allocation and usage of hardware resources such as the memory, processing time and peripheral devices in the computer system 100. In this manner, the operating system 123 serves as the foundation on which applications depend as is generally known by those with ordinary skill in the art.

Next, a description of the operation of the computer system 100 in executing the processor hardware application 126 is provided. To begin, a user manipulates the computer system 100 through appropriate input devices such as, for example, a keyboard, a mouse, or other input device to cause the execution of the processor hardware application 126. Once the processor hardware application 126 is executed, then the processor hardware driver loader 129 is automatically executed as a portion thereof to determine a processor compatibility of the operating system 123 executed in the computer system 100. As stated above, the operating system 123 is compatible with a respective one of a plurality of different types of processors 103, where the processor 103 is a given one of the processor types. To determine the processor compatibility of the operating system 123, the processor hardware driver loader 129 may call, for example, an appropriate method within the operating system 123 to obtain the operating system version or configuration that indicates which processor type with which the operating system 123 is compatible.

Once the processor compatibility of the operating system 123 is known, then an association is drawn between the processor compatibility of the operating system 123 and one of the processor hardware drivers 133 embedded in the processor hardware application 126. The association is drawn between the processor compatibility of the operating system 123 and the one of the drivers that is compatible with the operating system 123. In this respect, each of the processor hardware drivers 133 includes various tags or other information that informs the processor hardware driver loader 129 of its compatibility with a specific type of operating system 123. Alternatively, a table may be included in the processor hardware application 126 that is consulted to map operating system compatibilities to the various ones of the processor hardware drivers 133.

Once the appropriate processor hardware driver 133 is identified, the processor hardware driver loader 129 implements the execution of the processor hardware driver 133. In implementing the execution of the one of the processor hardware drivers 133, the processor hardware driver loader 129 automatically copies the respective processor hardware driver 133 from the processor hardware application 126 to the mass storage device 113. In one embodiment, the mass storage device 113 may be a hard drive. However, the mass storage device 113 may also comprise other forms of memory as was described above. The respective processor hardware driver 133 is loaded into the mass storage device 113 so that it may be executed as a separate executable file set apart from the processor hardware application 126.

Thereafter, the processor hardware driver loader 129 automatically initiates the execution of the selected one of the drivers 133 in the computer system 100 from the mass storage device 113. In this respect, the processor hardware driver loader 129 may implement the execution of the processor hardware driver 133 stored in the mass storage device 113 by making an appropriate call to an appropriate method of the operating system 123 as can be appreciated. Thereafter, the processor hardware driver 133 that was stored in the mass storage device 113 is loaded into a RAM portion of the memory 106, for example, for execution by the processor 103. Thereafter, the processor hardware application 126 may access the hardware of the computer system 100 through such processor hardware driver 133 as can be appreciated.

Once the execution of the processor hardware application 126 is complete and the user closes the processor hardware application 126, then during the procedure implemented to close the processor hardware application 126, the processor hardware driver loader 129 causes the one of the drivers that was executed by the processor 103 to be closed as well. In addition, the processor hardware driver loader 129 also deletes the one of the processor hardware drivers 133 from the mass storage device 113 after the closing of the driver itself.

Figure 2:
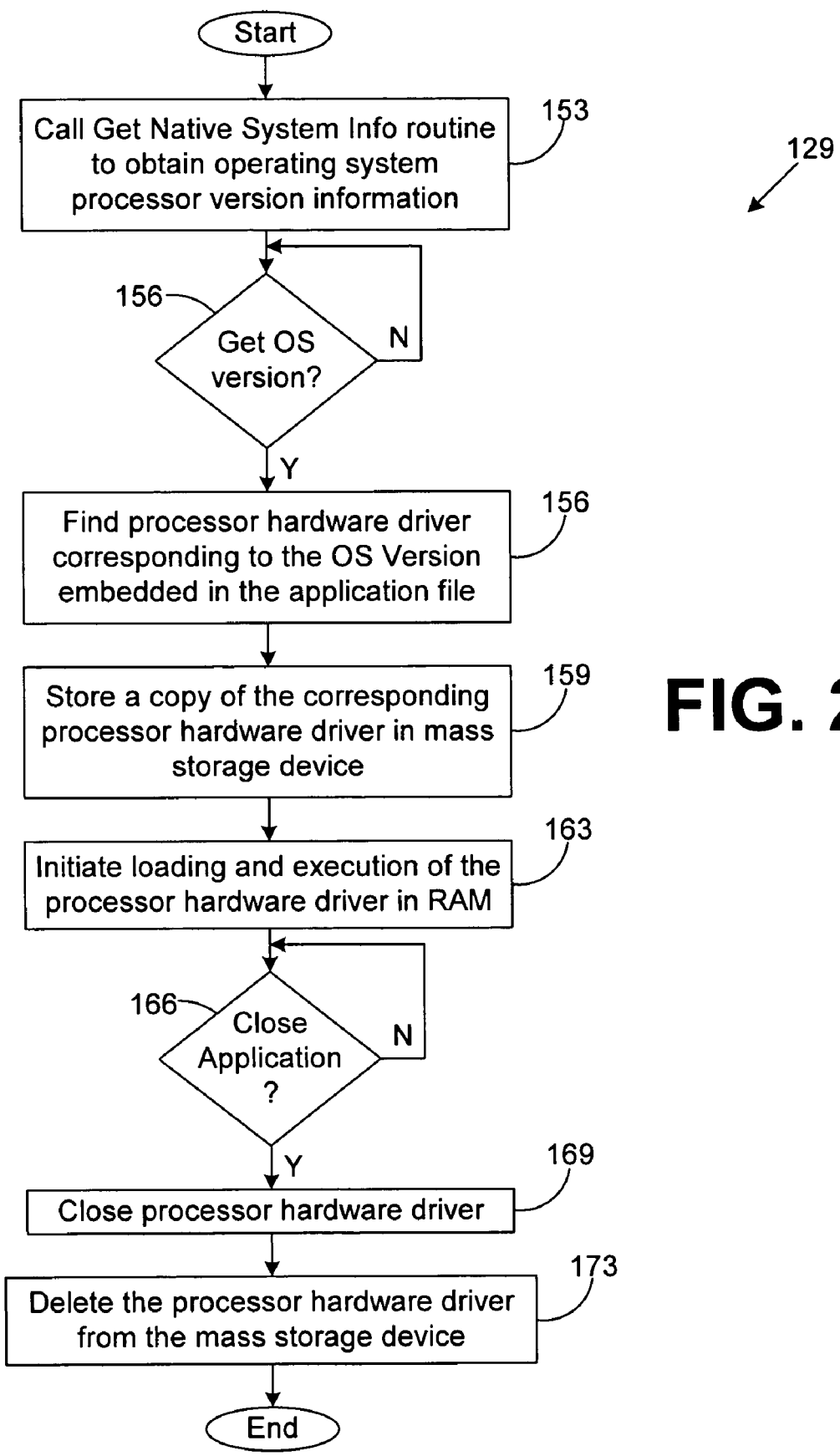
FIG. 2 is a flow chart of a processor hardware driver loader included in the application of FIG. 1 according to an embodiment of the present invention.

Referring next to FIG. 2, shown is flow chart that provides one example of the operation of the processor hardware driver loader 129 according to an embodiment of the present invention. Alternatively, the flow chart of FIG. 2 may be viewed as depicting steps of an example of a method implemented in the computer system 100 (FIG. 1) to implement the execution of a compatible one of the processor hardware drivers 133 (FIG. 1) to facilitate access to the hardware in the computer system 100 by the processor hardware application 126 (FIG. 1). The functionality of the processor hardware driver loader 129 as depicted by the example flow chart of FIG. 2 may be implemented, for example, in an object oriented design or in some other programming architecture. Assuming the functionality is implemented in an object oriented design, then each block represents functionality that may be implemented in one or more methods that are encapsulated in one or more objects. The processor hardware driver loader 129 may be implemented using any one of a number of programming languages such as, for example, C, C++, Assembly, or other programming languages.

Beginning with box 153, the processor hardware driver loader 129 obtains the version of the operating system 123 by making appropriate calls to obtain needed operating system information to the operating system 123. For example, in a Windows™ based system, a Windows system call "GetNativeSystemInfo" may be made to determine the operating system 123 version and the processor type or architecture upon which the operating system 123 and the processor hardware application 126 are running.

Thereafter, in box 156 the processor hardware driver loader 129 waits until the version of the operating system has been obtained by virtue of a reply to the system call, etc. Assuming that the operating system version is known, then in box 156 the processor hardware driver loader 129 finds the processor hardware driver 133 that is compatible with the version of the operating system. Specifically, the specific processor hardware driver 133 that was embedded within the application 126 is located, for example, using a look-up table that maps the operating system versions with the specific processor hardware driver files. In addition, such table points to the specific location within the processor hardware application 126 where the respective processor hardware drivers 133 begin and ends. Alternatively, various tags may be associated with the beginning and ending of each of the processor hardware drivers 133 in order to facilitate finding the same within the processor hardware application 126, given that the processor hardware drivers 133 are embedded such that the processor hardware application 126 appears as a single file even though the processor hardware drivers 133 are included within it. As an additional alternative, rather than including a table in the processor hardware application 126 to look up a desired processor hardware driver 133, the tags associated with each of the processor hardware drivers 133 may be searched. In addition, other approaches may be employed to find the processor hardware drivers 133 embedded in the processor hardware application 126. Regardless of the approach employed, an association is drawn between the processor compatibility of the operating system and a compatible one of the processor hardware drivers 133 embedded in the processor hardware application 126.

Thereafter, the processor hardware driver loader 129 proceeds to automatically store a copy of the corresponding processor hardware driver 133 in the mass storage device 113. This is done so that the processor hardware driver 133 may be executed in the processor circuit from the mass storage device 113 as is done with other applications, etc. Specifically, where the mass storage device 113 is a hard drive, then the processor hardware driver 133 is executed by making an appropriate call to the operating system 123 as can be appreciated. In any event, the processor hardware drivers 133 are not executable as a portion of the processor hardware application 126 since they are executed as separate files.

Next, in box 163, the processor hardware driver loader 129 initiates the loading and execution of the processor hardware driver 133 using the processor circuit. In this respect, the respective processor hardware driver 133 may be loaded from the mass storage device 113 which may be a hard drive, for example, into random access memory as a portion of the memory 106 for execution by the processor 133.

Thereafter, in box 166 the processor hardware driver loader 129 waits until the processor hardware application 126 is closed, usually at the direction of a user. Assuming this to be the case, then the processor hardware driver loader 129 proceeds to box 169 in which the processor hardware driver 133 is closed and deleted from the random access memory or other portion of the memory 106 upon which it was executed. Thereafter, in box 173, the processor hardware driver 133 is deleted from the mass storage device 113 as it is no longer needed for execution given that the processor hardware application 126 has been closed.

In this respect, the functions of copying the processor hardware driver 133 to the mass storage device 113, loading and execution of the processor hardware driver 133, closing of the processor hardware driver 133, and deletion of the processor hardware driver 133 from the mass storage device 113 as depicted in boxes 159, 163, 166, 169, and 173 are all implemented automatically without user intervention or input. In this respect, the user only needs to execute a single file, namely, the processor hardware application 126, and there is no need to load and execute a separate hardware driver compatible with the operating system 123 and the processor 103 in order to obtain access to the computer hardware of the computer system 100.

Also, given the processor hardware drivers 133 are embedded in the processor hardware application 126 when it is created, there is no risk of inadvertently loading out-of-date processor hardware drivers 133 in conjunction with the execution of various processor hardware applications 126, thereby possibly resulting in system failure, etc. In addition, given that the processor hardware drivers 133 are automatically closed and deleted in boxes 169 and 173 above, the processor hardware driver loader 129 prevents the processor hardware drivers 133 from unnecessarily using memory storage capacity in the processor circuit of the computer system 100, thereby facilitating more efficient operation with respect to remaining applications executed thereon.

Although the processor hardware application 126 and the processor hardware driver loader 129 as a portion thereof are embodied in software or code executed by general purpose hardware as discussed above, as an alternative the same may also be embodied in dedicated hardware or a combination of software/general purpose hardware and dedicated hardware. If embodied in dedicated hardware, the processor hardware application 126 and the processor hardware driver loader 129 as a portion thereof can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram and flow chart of FIGS. 1 and 2 show the architecture, functionality, and operation of an implementation of the processor hardware application 126 and the processor hardware driver loader 129 as a portion thereof. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow chart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the processor hardware application 126 and the processor hardware driver loader 129 as a portion thereof comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the processor hardware application 126 and the processor hardware driver loader 129 as a portion thereof for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Figure 3:
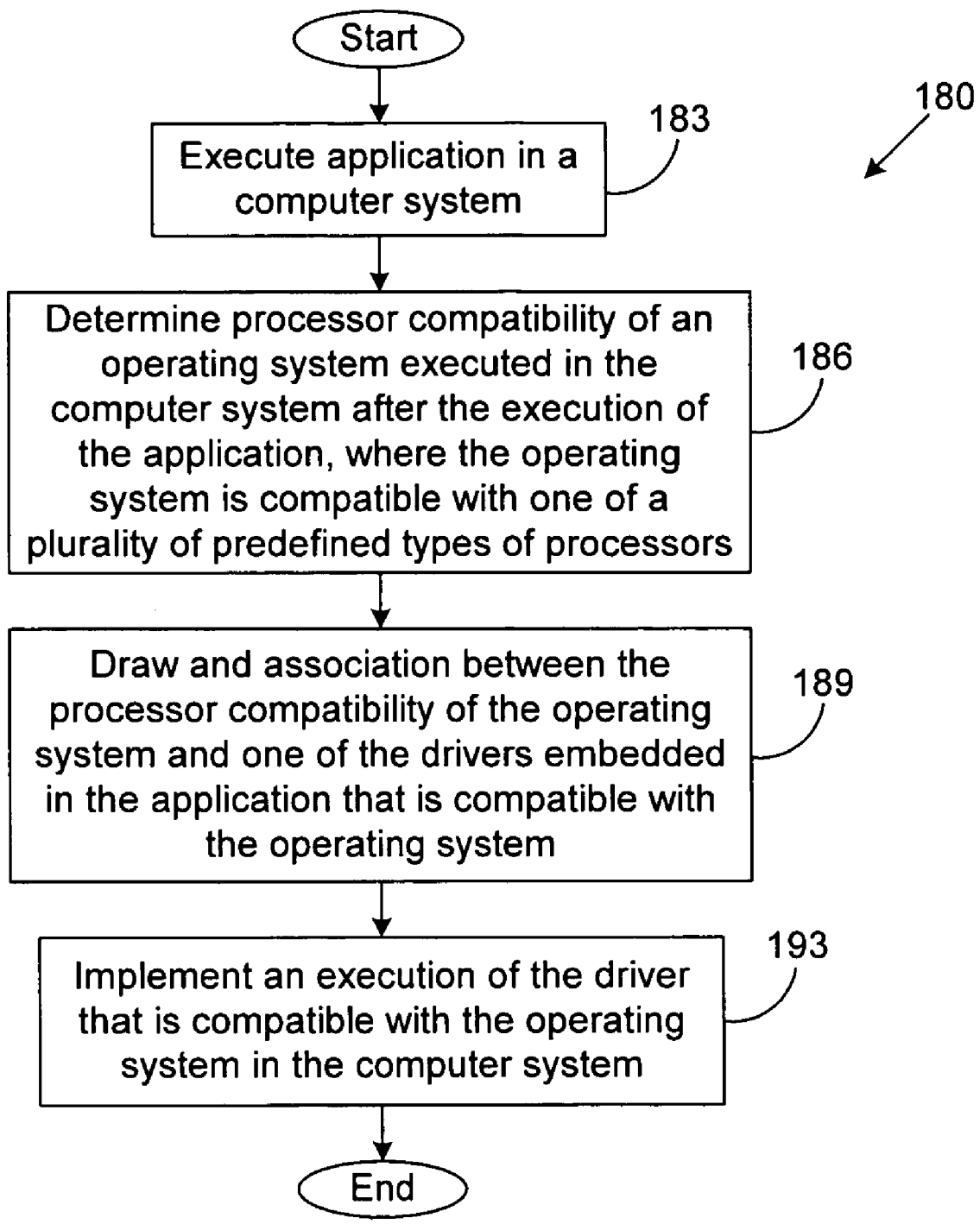
FIG. 3 is a flow chart of one example of a method for driver execution in association with an application according to an embodiment of the present invention.

With reference to FIG. 3, shown are steps of one example of a method 180 for execution of a driver such as, for example, processor hardware driver 133 in association with an application such as, for example, processor hardware application 126 (FIG. 1) according to an embodiment of the present invention. Beginning with step 183, the application such as the processor hardware application 126 is executed in a computer system 100. Thereafter, in step 186, a processor compatibility of an operating system 123 executed in a computer system 100 after the execution of the application 126, where the operating system 123 is compatible with one of a plurality of predefined types of processors 103. Then, in step 189, an association is drawn between the processor compatibility of the operating system 123 and one of a plurality of drivers 133 embedded in the application 126, the one of the drivers 133 being compatible with the operating system 123. Implementing an execution of the one of the drivers 133 that is compatible with the operating system 123 in the computer system 100.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for driver execution in association with an application, comprising:

executing the application in a computer system;

determining a processor compatibility of an operating system executed in a computer system after the execution of the application, wherein the operating system is compatible with one of a plurality of predefined types of processors;

drawing an association between the processor compatibility of the operating system and one of a plurality of drivers embedded in the application, the one of the drivers being compatible with the operating system; and implementing an execution of the one of the drivers that is compatible with the operating system in the computer system by:

automatically copying the one of the drivers from the application to a mass storage device; and automatically initiating an execution of the one of the drivers in the computer system from the mass storage device with the application.

2. The method of claim 1, wherein the automatically copying of the one of the drivers from the application to the mass storage device further comprises automatically copying of the one of the drivers from the application to a hard drive in the computer system.

3. The method of claim 1, further comprising closing the one of the drivers upon a closing of the application.

4. The method of claim 3, further comprising deleting the one of the drivers from a mass storage device after the closing of the one of the drivers.

5. A program embodied in a computer readable medium for driver execution, comprising:

an application;

a plurality of drivers embedded in the application, each of the drivers being compatible with a corresponding one of a plurality of operating systems, wherein each of the operating systems is compatible with a corresponding one of a plurality of predefined types of processors;

a loader included in the application, the loader comprising:
    code that draws an association between the processor compatibility of one of the operating systems and the compatible one of the drivers; and
    code that implements an execution of the compatible one of the drivers in a computer system in conjunction with an execution of the application in the computer system, the code that implements further comprising:
        code that automatically copies the compatible one of the drivers from the application to a mass storage device associated with the computer system; and
        code that automatically initiates the execution of the compatible one of the drivers in the computer system from the mass storage device.

6. The program embodied in the computer readable medium of claim 5, wherein the code that automatically copies the compatible one of the drivers from the application to the mass storage device associated with the computer system further comprises code that automatically copies the compatible one of the drivers from the application to a hard drive in the computer system.

7. The program embodied in the computer readable medium of claim 5, further comprising code that closes the compatible one of the drivers upon a closing of the application.

8. The program embodied in the computer readable medium of claim 7, further comprising code that deletes the compatible one of the drivers from a mass storage device after the closing of the compatible one of the drivers.

9. A system for driver execution, comprising:
    a processor circuit having a processor and a memory;
    an application stored in the memory and executable by the processor, the application comprising:
        a plurality of drivers embedded in the application, each of the drivers being compatible with a corresponding one of a plurality of operating systems, wherein each of the operating systems is compatible with a corresponding one of a plurality of predefined types of processors;
        a loader included in the application, the loader comprising:
            logic that draws an association between one of the operating systems compatible with the processor and the compatible one of the drivers; and
            logic that implements an execution of the compatible one of the drivers by the processor in conjunction with an execution of the application by the processor, the logic that implements further comprising:
                logic that automatically copies the compatible one of the drivers from the application to a mass storage device associated with the processor circuit; and
                logic that automatically initiates the execution of the compatible one of the drivers by the processor from the mass storage device.

10. The system of claim 9, wherein the mass storage device is a hard drive operatively coupled to the processor circuit.

11. The system of claim 9, wherein the loader further comprises logic that closes the compatible one of the drivers upon a closing of the application.

12. The system of claim 11, wherein the loader further comprises logic that deletes the compatible one of the drivers from a mass storage device after the closing of the compatible one of the drivers.

13. A system having a processor for driver execution, comprising:
    means for executing an application having a plurality of embedded drivers, each of the embedded drivers being compatible with a corresponding one of a plurality of operating systems, wherein each of the operating systems is compatible with a corresponding one of a plurality of predefined types of processors;
    means for drawing an association between the processor compatibility of one of the operating systems and a compatible one of the embedded drivers; and
    means for implementing an execution of the compatible one of the embedded drivers in a computer system in conjunction with an execution of the application in the computer system, the means for implementing further comprising:
        means for automatically copying the compatible one of the embedded drivers from the application to a mass storage device; and
        means for automatically initiating the execution of the compatible one of the embedded drivers by the processor from the mass storage device.

14. The system of claim 13, wherein the mass storage device is a hard drive operatively coupled to the processor circuit.

15. The system of claim 13, further comprising means for closing the compatible one of the embedded drivers upon a closing of the application.

16. The system of claim 15, further comprising means for deleting the compatible one of the embedded drivers from a mass storage device after the closing of the compatible one of the embedded drivers.

* * * * *